(12) United States Patent
Rapp

(10) Patent No.: US 7,000,283 B2
(45) Date of Patent: Feb. 21, 2006

(54) WIPER DRIVE

(75) Inventor: Juergen Rapp, Lauf (DE)

(73) Assignee: Robert Bosch GmbH, Stuttgart (DE)

( * ) Notice: Subject to any disclaimer, the term of this patent is extended or adjusted under 35 U.S.C. 154(b) by 238 days.

(21) Appl. No.: 10/296,703

(22) PCT Filed: Aug. 16, 2001

(86) PCT No.: PCT/DE01/03151

§ 371 (c)(1),
(2), (4) Date: Nov. 26, 2002

(87) PCT Pub. No.: WO02/22409

PCT Pub. Date: Mar. 21, 2002

(65) Prior Publication Data

US 2003/0131436 A1 Jul. 17, 2003

(30) Foreign Application Priority Data

Sep. 14, 2000 (DE) ................................ 100 45 573

(51) Int. Cl.
*B60S 1/18* (2006.01)
*B60S 1/24* (2006.01)

(52) U.S. Cl. ........................................ 15/250.3; 74/42

(58) Field of Classification Search ............... 15/250.3, 15/250.31; 74/42, 43, 89

See application file for complete search history.

(56) References Cited

U.S. PATENT DOCUMENTS

| 2,046,108 | A | * | 6/1936 | Drew ...................... 15/250.3 |
| 3,242,520 | A | * | 3/1966 | Carroll et al. ........... 15/250.17 |
| 4,309,646 | A | * | 1/1982 | Liedtke et al. ............... 318/443 |
| 4,672,708 | A | * | 6/1987 | Williams ............... 15/250.003 |
| 5,287,585 | A |   | 2/1994 | Yamamoto |
| 5,979,254 | A | * | 11/1999 | Blanchet et al. ............... 74/42 |
| 6,606,760 | B1 | * | 8/2003 | Koumo et al. ............. 15/250.3 |
| 6,792,643 | B1 | * | 9/2004 | Ponziani ................. 15/250.31 |

FOREIGN PATENT DOCUMENTS

| DE | 3313057 | * | 10/1984 |
| DE | 4337104 | * | 10/1993 |
| DE | 197 44 906 A |   | 4/1998 |
| DE | 197 44 906 A1 |   | 4/1998 |
| DE | 100 11 842 A |   | 10/2001 |
| EP | 0 781 691 A1 |   | 7/1997 |
| EP | 0 806 330 A |   | 11/1997 |
| EP | 0 806 330 A2 |   | 11/1997 |
| FR | 2 580 567 A |   | 10/1986 |

* cited by examiner

Primary Examiner—Gary K. Graham
(74) Attorney, Agent, or Firm—Michael J. Striker

(57) ABSTRACT

The invention is based on a wiper drive having a reversible geared motor, which is secured to a wiper mounting and on whose power takeoff shaft (12) a motor crank (14) is seated that is connected via at least one joint (16) to a lever gear which drives at least one windshield wiper. It is provided that either the motor crank (14) on the power takeoff shaft (12) of the geared motor, or a drive element (28) drivingly connected to the motor crank (14), cooperates with stops (18, 20, 32, 34) that prevent an overswing past the turning points of the windshield wiper.

2 Claims, 2 Drawing Sheets

WIPER DRIVE

BACKGROUND OF THE INVENTION

The invention relates to a wiper drive.

From European Patent Disclosure, a wiper drive is known which includes a motor with a gear and a motor crank seated on a power takeoff shaft. This crank, via a lever gear, drives a windshield wiper. This arrangement is used for concentric and reversing motors, and the lever gear must be adapted to the type of drive involved. In reversing motors, there is the danger that if the control is defective, the motor will move past the terminal positions of the pivoting motion. The windshield wipers coupled to it would also move past their wiping range and cause damage to the vehicle body and to themselves.

SUMMARY OF THE INVENTION

According to the invention, either the motor crank on the power takeoff shaft of the geared motor, or a drive element drivingly connected to the motor crank, cooperates with stops that prevent an overswing past the turning points of the windshield wiper. This prevents damage to the windshield wipers and/or the vehicle body in the event of a defect in the control of the reversible wiper motor.

Expediently, the stops are provided on the wiper mounting in the region of the motor crank. They are mounted or formed on at a distance from one another of a rotational angle phi that is slightly larger than the pivot angle of the motor crank. Thus in normal operation, the motor crank can work without any hindrance, while if there is a defect in the control, the worst that can happen is that it meets one of the stops, which prevents any further overswing.

It is appropriate for the stops to be disposed in the region of the motor crank, because as a result, in the event of a defect, the rod linkage of the lever gear is not stressed by blocking forces. However, it is also possible for the stops to cooperate with some other drive element, such as a crank on a drive shaft of a windshield wiper. In that case, components located in the vicinity can advantageously be used as stops.

BRIEF DESCRIPTION OF THE DRAWINGS

Further advantages will become apparent from the ensuing description of the drawing. In the drawing, exemplary embodiments of the invention are shown. The drawing, description and claims include numerous characteristics in combination. One skilled in the art will expediently consider these characteristics individually as well and put them together to make further useful combinations.

Shown are.

DETAILED DESCRIPTION OF THE PREFERRED EMBODIMENTS

Figure 1:
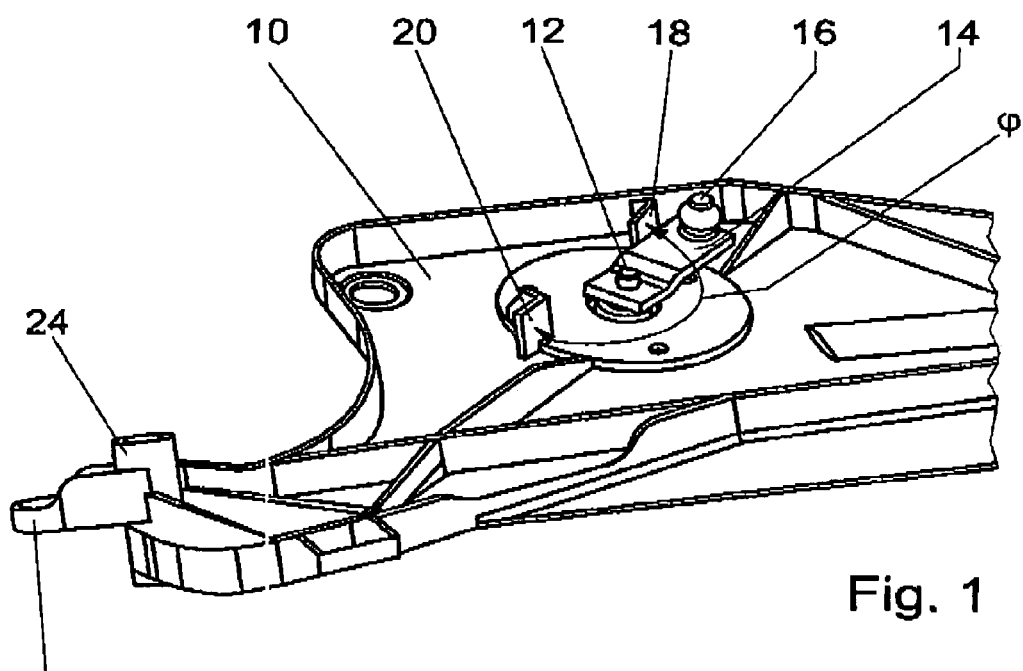
FIG. 1, a fragmentary perspective view of a wiper mounting with a motor crank.

A reversible wiper motor is secured to a wiper mounting 10, and a motor crank 12 is seated on the power takeoff shaft 12 of the motor. Coupled to the free end of the motor crank 14, via a ball-like joint peg 15, is a lever gear, not identified by reference numeral, which drivingly connects the motor crank 14 to a crank 28 on a drive shaft 26 for a windshield wiper, also not identified by reference numeral (see FIG. 2). The drive shaft 26 is supported in a wiper bearing 24 in the vicinity of a fastening eyelet 22 of the wiper mounting 10.

In the region of the motor crank 14, two stops 18 and 20 are disposed on the wiper mounting 10. They are spaced apart from one another by a rotational angle phi which is somewhat larger than the pivot angle of the motor crank 14, so that the stops 18, 20 do not impede normal operation, but do prevent the windshield wiper from being able to swing significantly past its turning points in the event of defective control of the wiper motor.

Figure 1A:
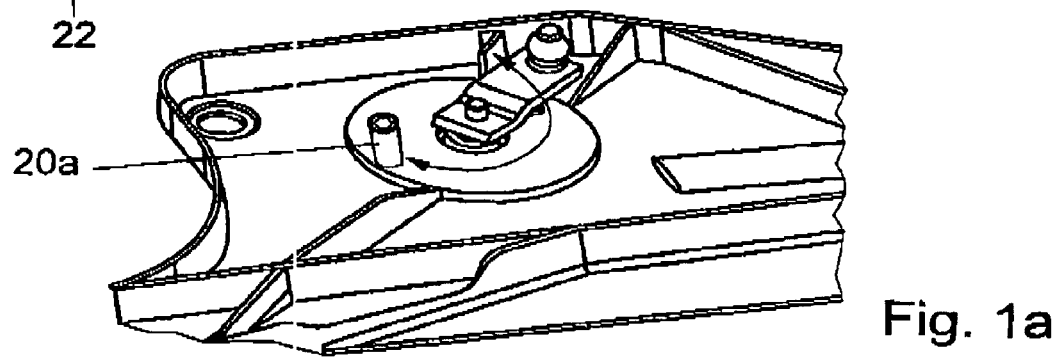
FIG. 1a shows a stop 20a used as a fastening element for the geared motor.

FIG. 1a shows an alternative, in which one of the stops, designated in FIG. 1a as 20a, can be used as a fastening element, for example, for the geared motor or wiper motor.

Figure 2:
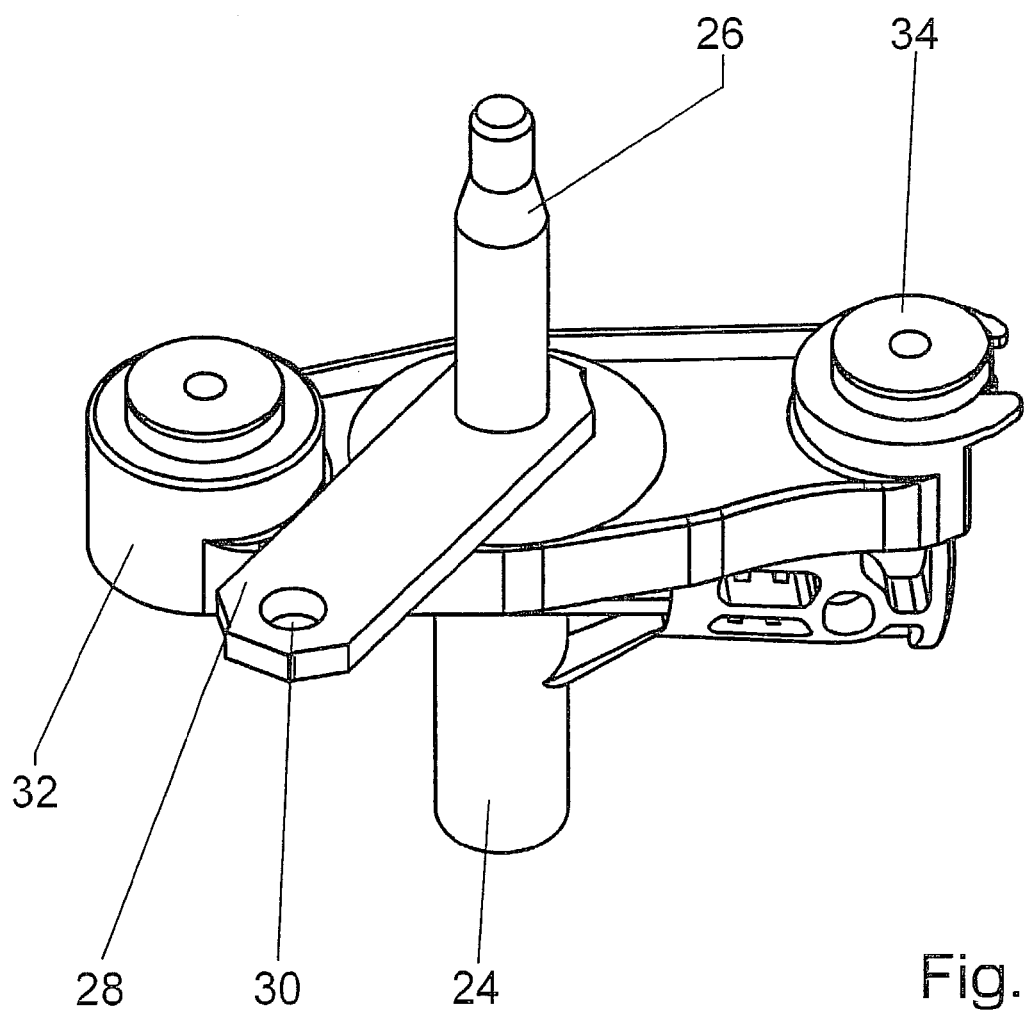
FIG. 2, a fragmentary perspective view of a wiper mounting with a wiper bearing.

In the variant of FIG. 2, two stops 32 and 34 are provided in the region of the crank 28 which has a bore 30 for receiving a joint peg; of these stops, one can be embodied as a fastening element of the wiper mounting 10.

What is claimed is:

1. A reversible wiper drive, comprising: an electric motor with a gear unit, which is secured to a wiper mounting and on whose power takeoff shaft (12) a motor crank (14) is seated, wherein the motor crank drives at least one windshield wiper via at least one joint (16), wherein the electric motor is a reversible motor with a control unit, wherein stops are provided in an area of the motor crank (14) on the wiper mounting (10), wherein the stops are spaced apart from one another by a rotational angle (ϕ) that is slightly larger than the pivot angle of the motor crank (14), so that the motor crank (14) cooperates with the stops (18, 20, 20a) only with a defect in the control unit of the electric motor.

2. The wiper drive of claim 1, wherein one stop (34) is embodied as a fastening element.

* * * * *